(12) United States Patent
Konakawa et al.

(10) Patent No.: US 7,640,921 B2
(45) Date of Patent: Jan. 5, 2010

(54) FUEL SUPPLY APPARATUS AND VEHICLE PROVIDED WITH THE SAME

(75) Inventors: Tsugunori Konakawa, Shizuoka (JP); Mitsutoshi Koide, Shizuoka (JP); Hiroaki Ito, Shizuoka (JP); Takahiro Ozawa, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 10/599,453

(22) PCT Filed: Nov. 22, 2004

(86) PCT No.: PCT/JP2004/017366

§ 371 (c)(1), (2), (4) Date: Jul. 12, 2007

(87) PCT Pub. No.: WO2005/100776

PCT Pub. Date: Oct. 27, 2005

(65) Prior Publication Data

US 2007/0289583 A1 Dec. 20, 2007

(30) Foreign Application Priority Data

Apr. 2, 2004 (JP) ............................. 2004-110043

(51) Int. Cl.
*F02M 29/00* (2006.01)
(52) U.S. Cl. .................................................. 123/590
(58) Field of Classification Search ................. 123/445, 123/472, 590, 548, 65 V, 41 R, 456, 468, 123/41.31, 190.14, 179.9, 294, 540, 545, 123/38, 298, 587, 73 V; 277/591; 261/65; 239/102.2, 533.3; *F02M 29/00*
See application file for complete search history.

(56) References Cited

U.S. PATENT DOCUMENTS

| 2,907,557 | A | * | 10/1959 | Coanda | 261/78.1 |
| 3,050,376 | A | * | 8/1962 | Bishop et al. | 422/168 |
| 3,374,777 | A | * | 3/1968 | Walker | 123/325 |
| 3,868,936 | A | * | 3/1975 | Rivere | 123/445 |
| 4,016,845 | A | * | 4/1977 | Marsee | 123/548 |

(Continued)

FOREIGN PATENT DOCUMENTS

EP 1398498 A1 3/2004

(Continued)

OTHER PUBLICATIONS

European search report for corresponding European application 04821892 lists the references above.

*Primary Examiner*—Stephen K Cronin
*Assistant Examiner*—Keith Coleman
(74) *Attorney, Agent, or Firm*—Hogan & Hartson LLP

(57) ABSTRACT

An injector bracket 10 is provided inside an air cleaner 5. The injector bracket 10 comprises a rectifying wall 10a bulging into a main chamber 5b, and a stream-line guide wall 10b in opposition to an air current M having passed through an element 8. The injector bracket 10 functions as a partition and forms a separate chamber 10e partitioned from the main chamber 5b in the air cleaner 5. An upstream injector unit 7 is arranged in the separate chamber 10e. The rectifying wall 10a is in the form of a symmetric blade.

30 Claims, 14 Drawing Sheets

U.S. PATENT DOCUMENTS

| | | | |
|---|---|---|---|
| 4,315,491 A * | 2/1982 | Takeda | 123/478 |
| 5,146,897 A | 9/1992 | Hattori et al. | |
| 6,827,064 B2 | 12/2004 | Akagi et al. | |
| 7,198,032 B2 * | 4/2007 | Taguchi et al. | 123/470 |
| 2004/0079337 A1 | 4/2004 | Akagi et al. | |
| 2005/0205067 A1 | 9/2005 | Koide et al. | |

FOREIGN PATENT DOCUMENTS

| | | |
|---|---|---|
| EP | 1580422 A1 | 9/2005 |
| JP | 57-073858 | 5/1982 |
| JP | 58-035266 | 3/1983 |
| JP | 61-053565 | 4/1986 |
| JP | 64-036653 | 3/1989 |
| JP | 01-300061 | 12/1989 |
| JP | 03-082875 | 8/1991 |
| JP | 09-126101 | 5/1997 |
| JP | 10-205410 | 8/1998 |
| JP | 10-281042 | 10/1998 |
| JP | 2000-097131 | 4/2000 |

* cited by examiner

[Fig. 1]
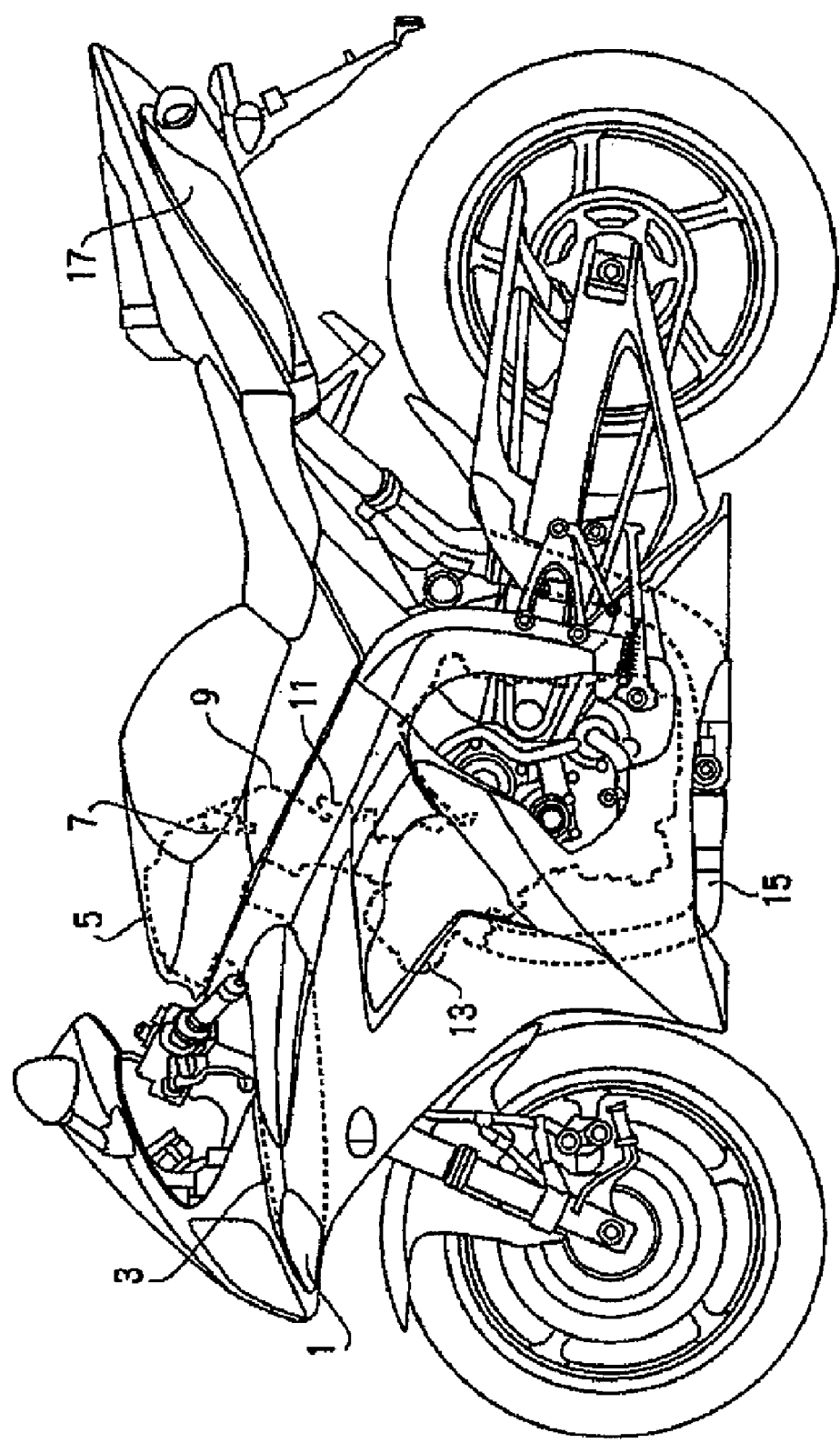

[Fig. 2]
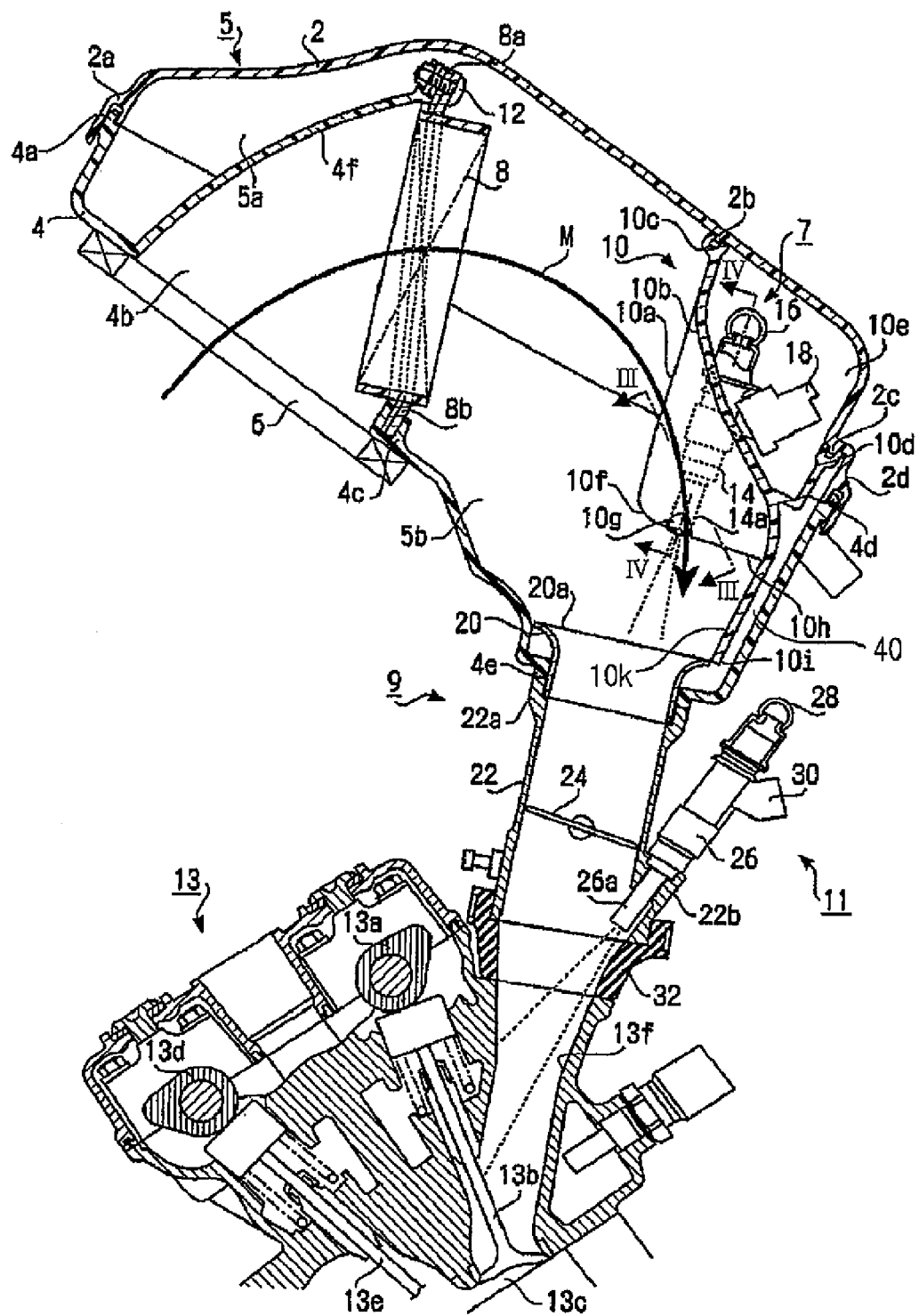

[Fig. 3]
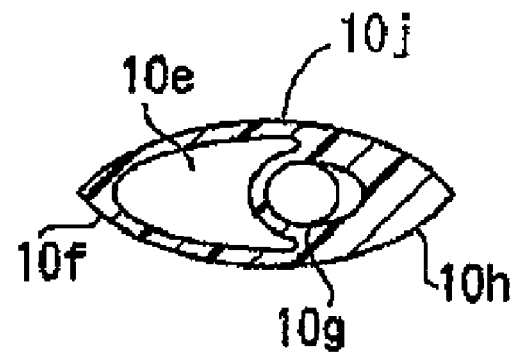
[Fig. 4]
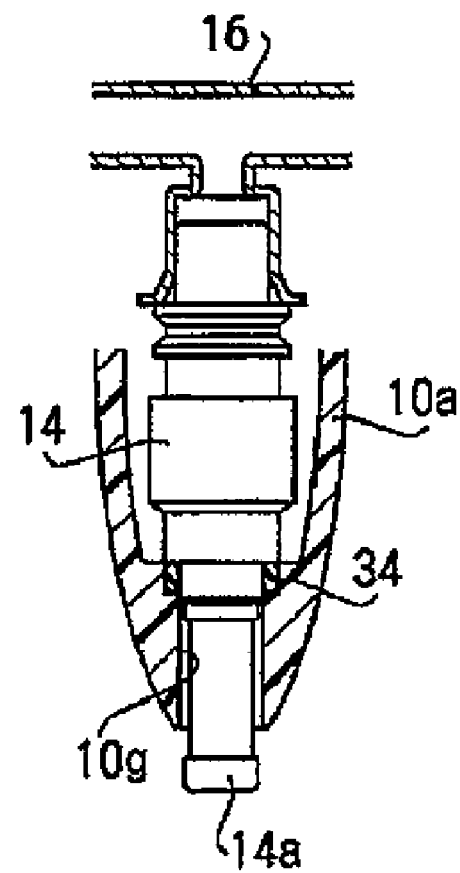

[Fig. 5]
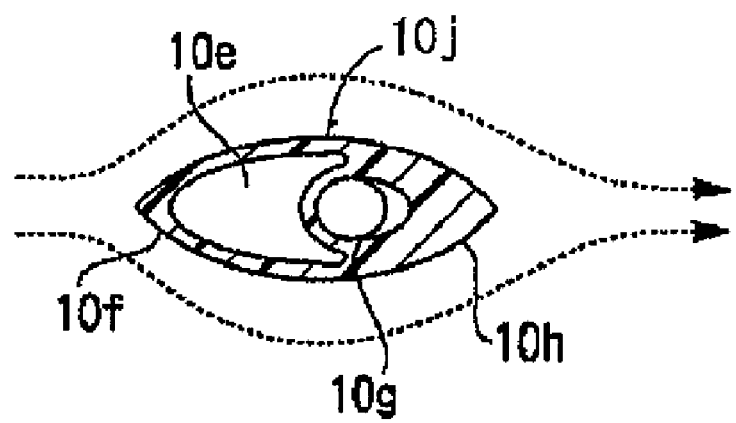

[Fig. 6]
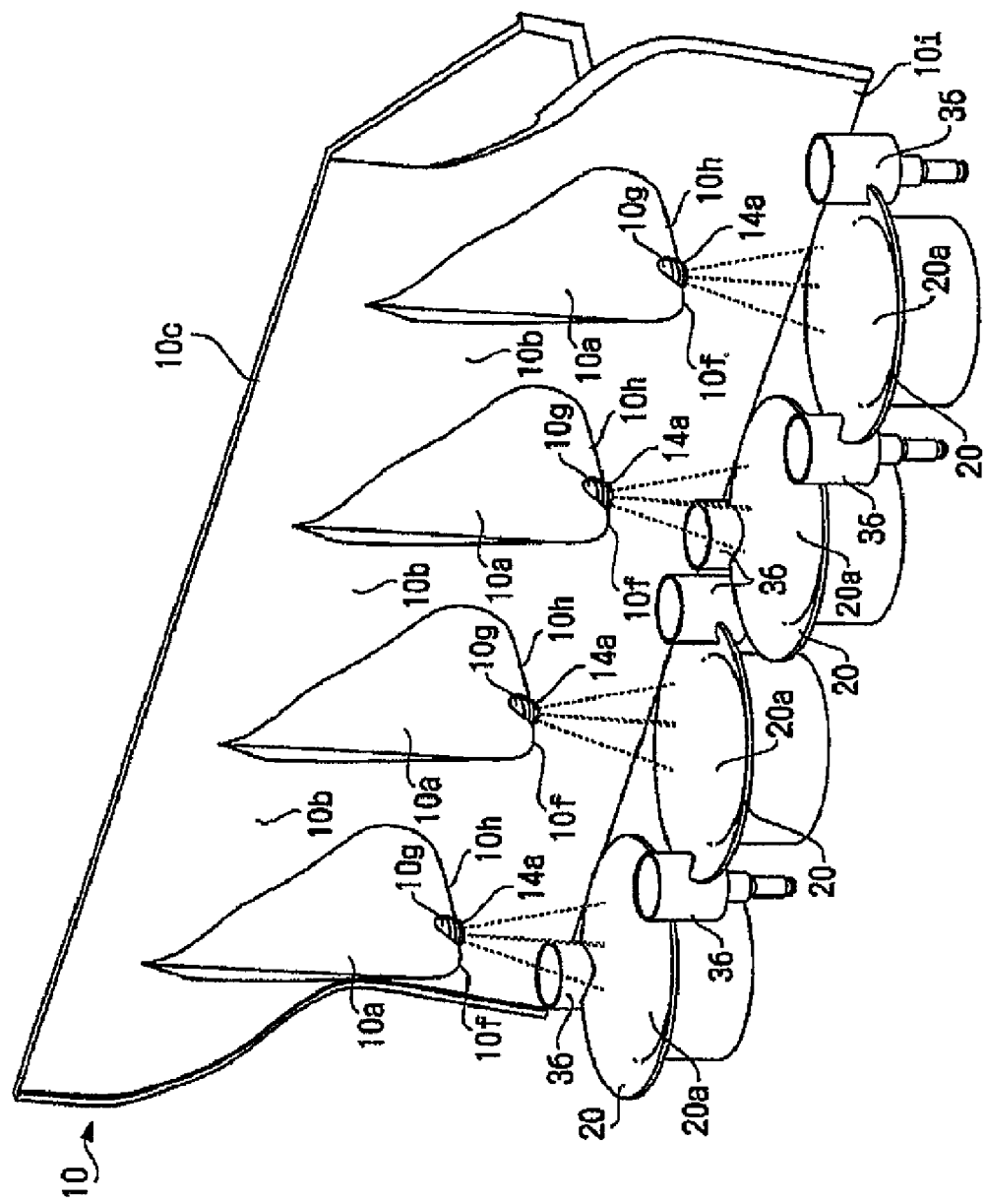

[Fig. 7]
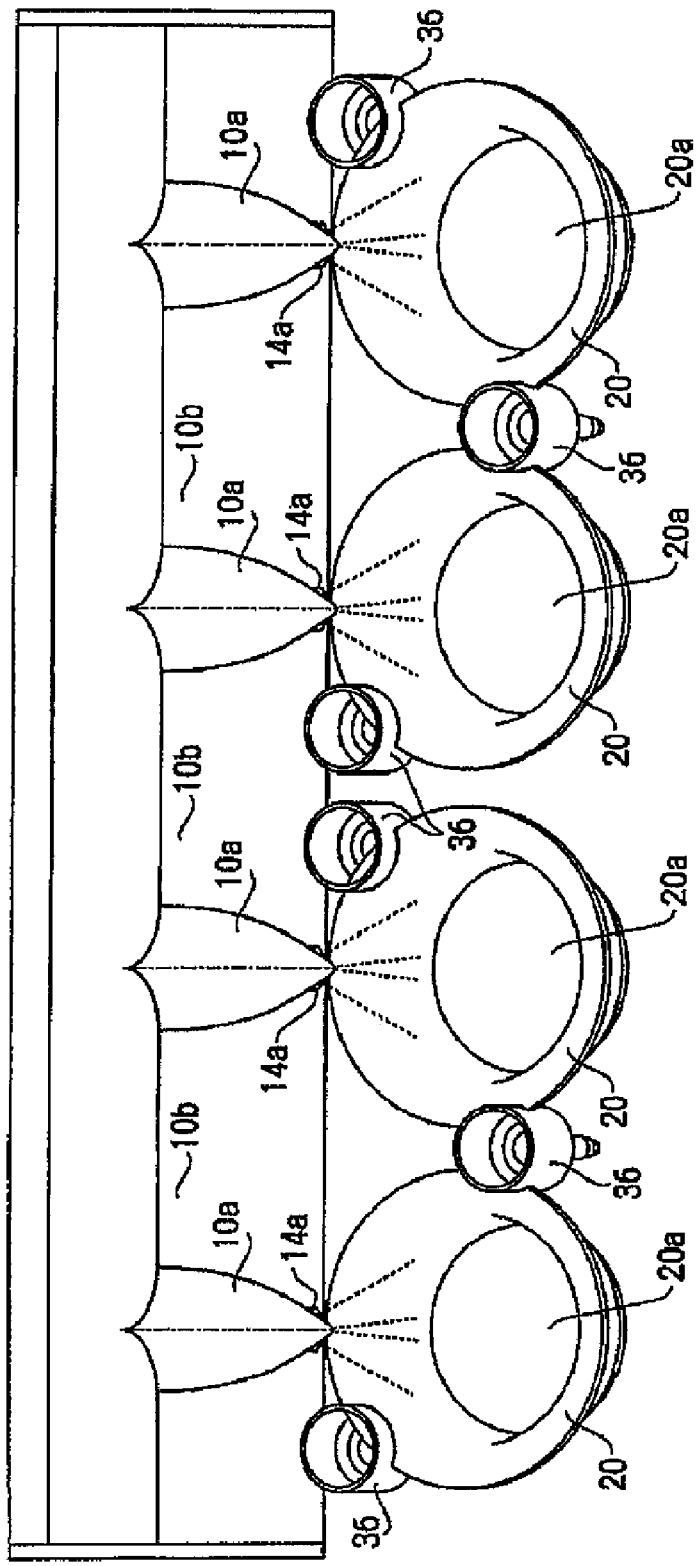

[Fig. 8]
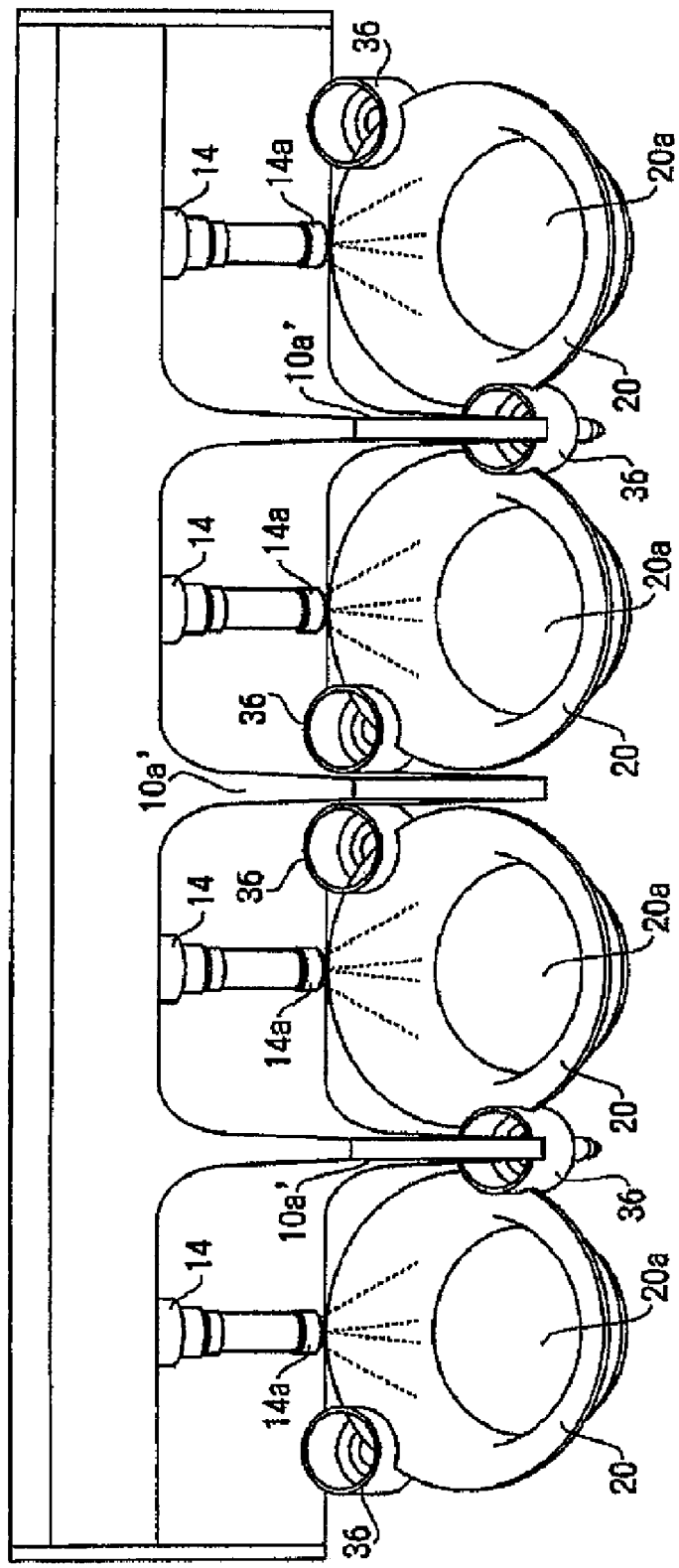

[Fig. 9]
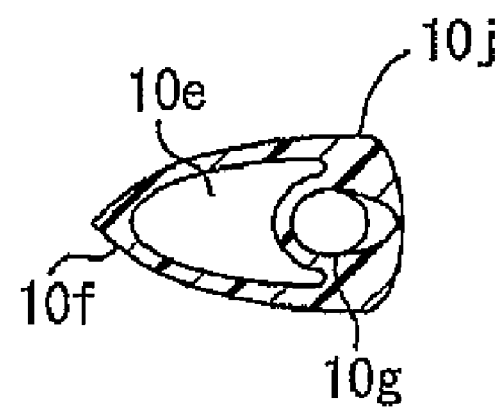
[Fig. 10]
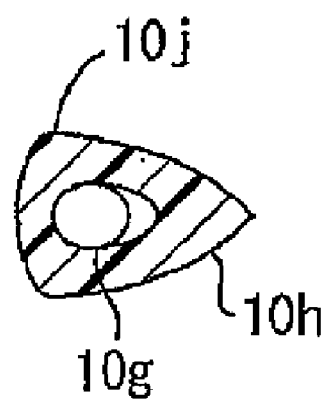

[Fig. 11]
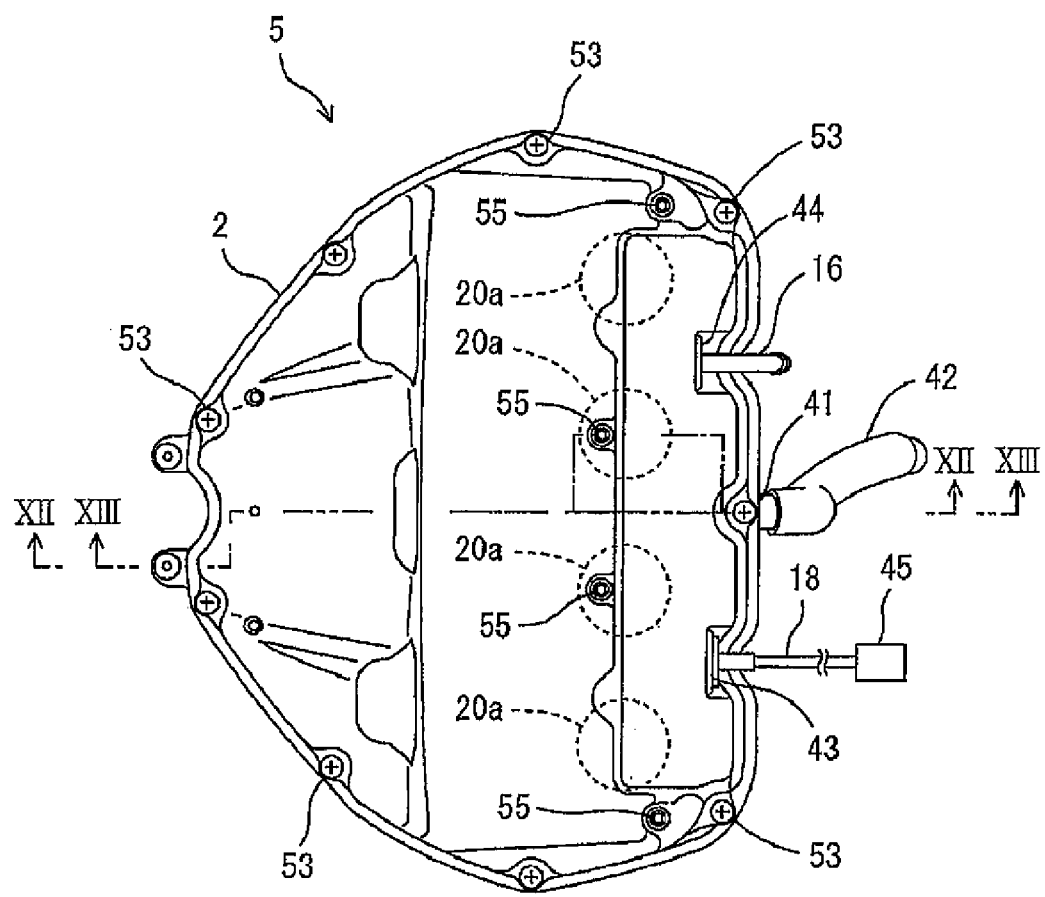

[Fig. 12]
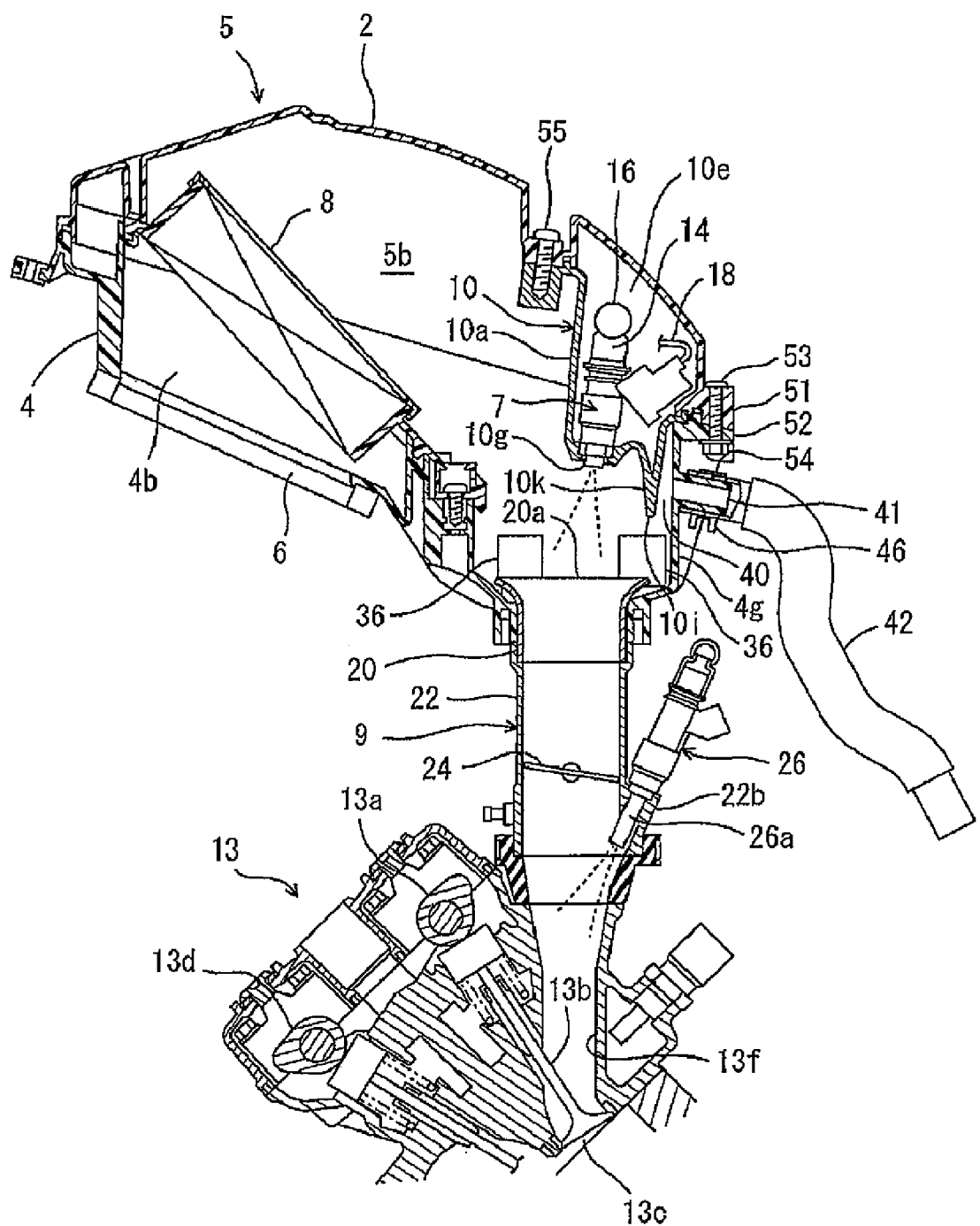

[Fig. 13]
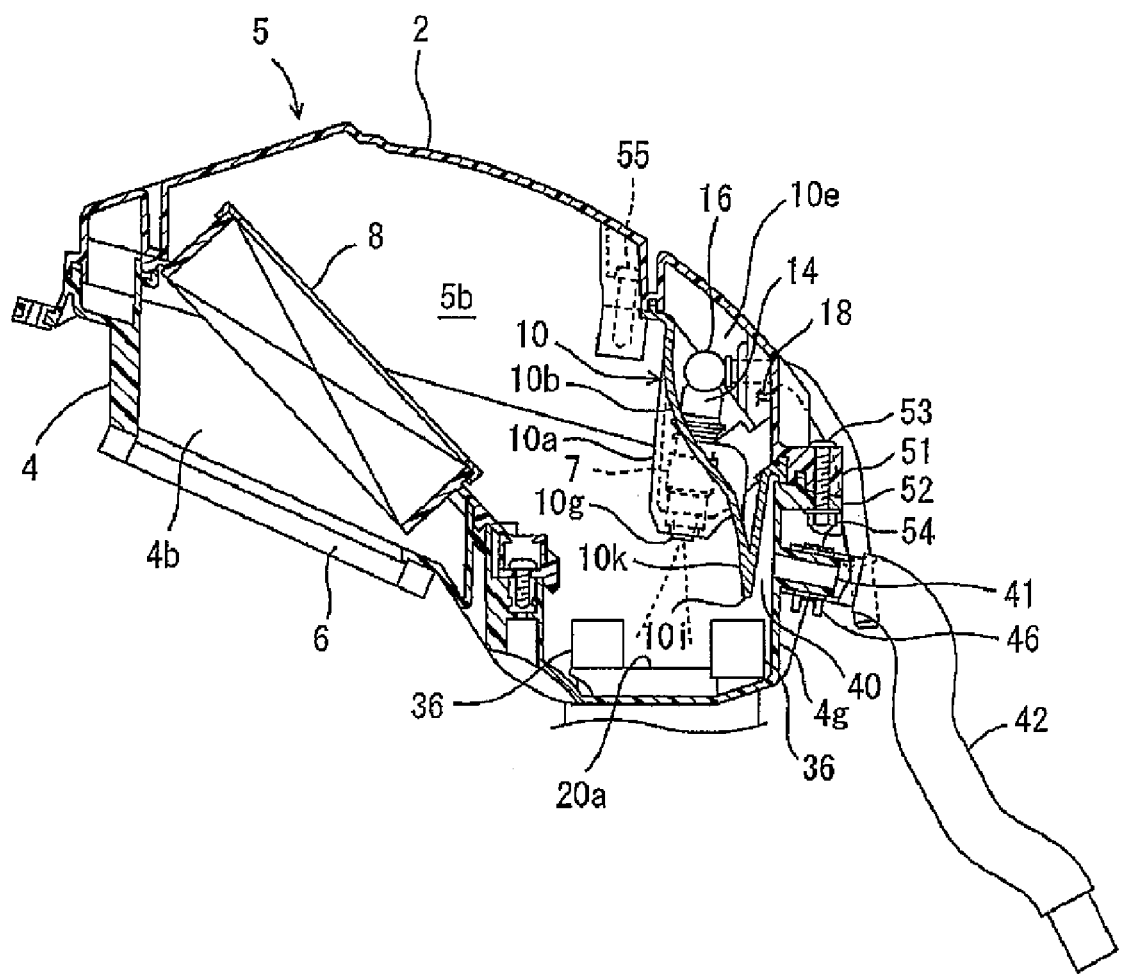

[Fig. 14]
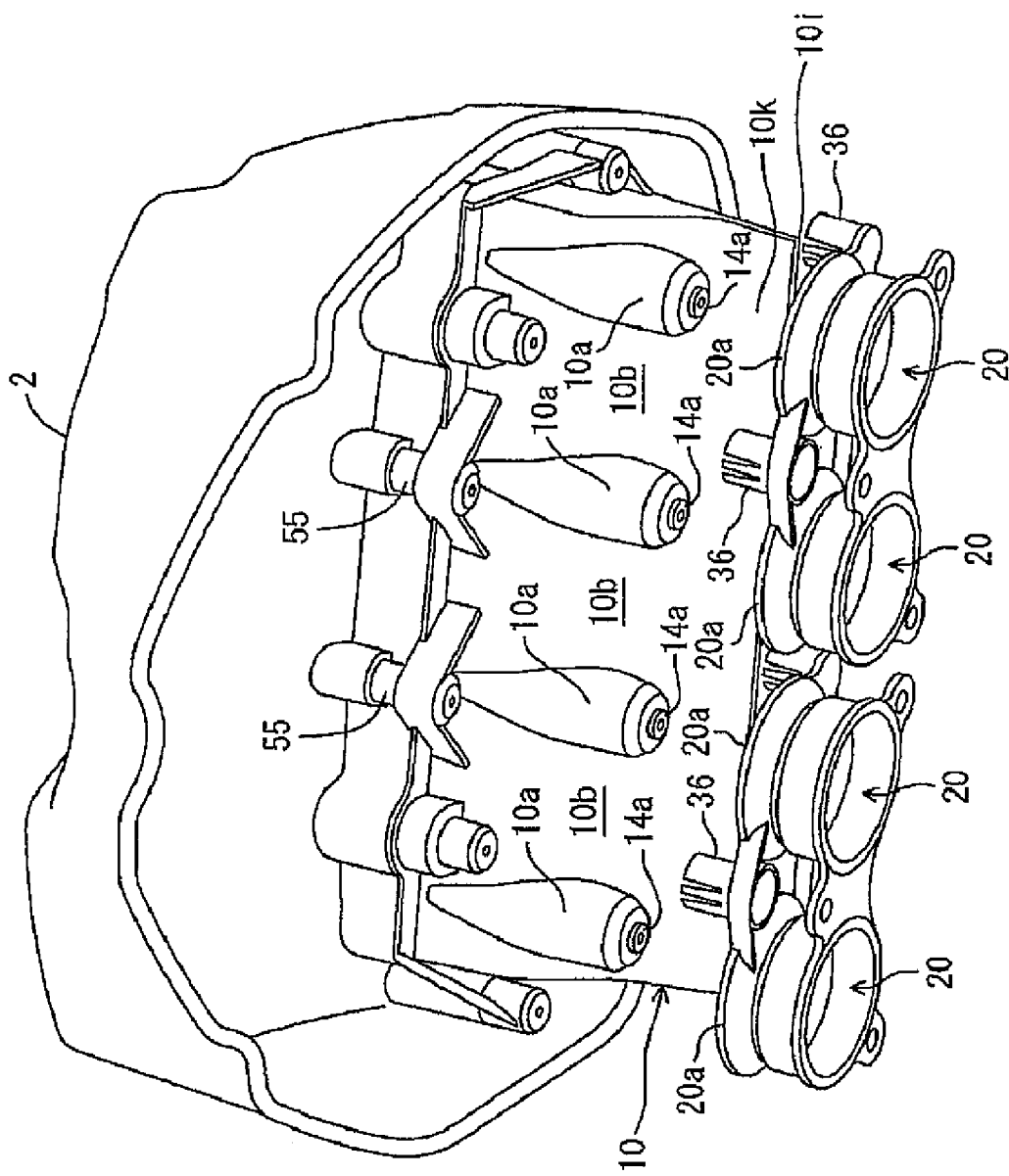

[Fig. 15]
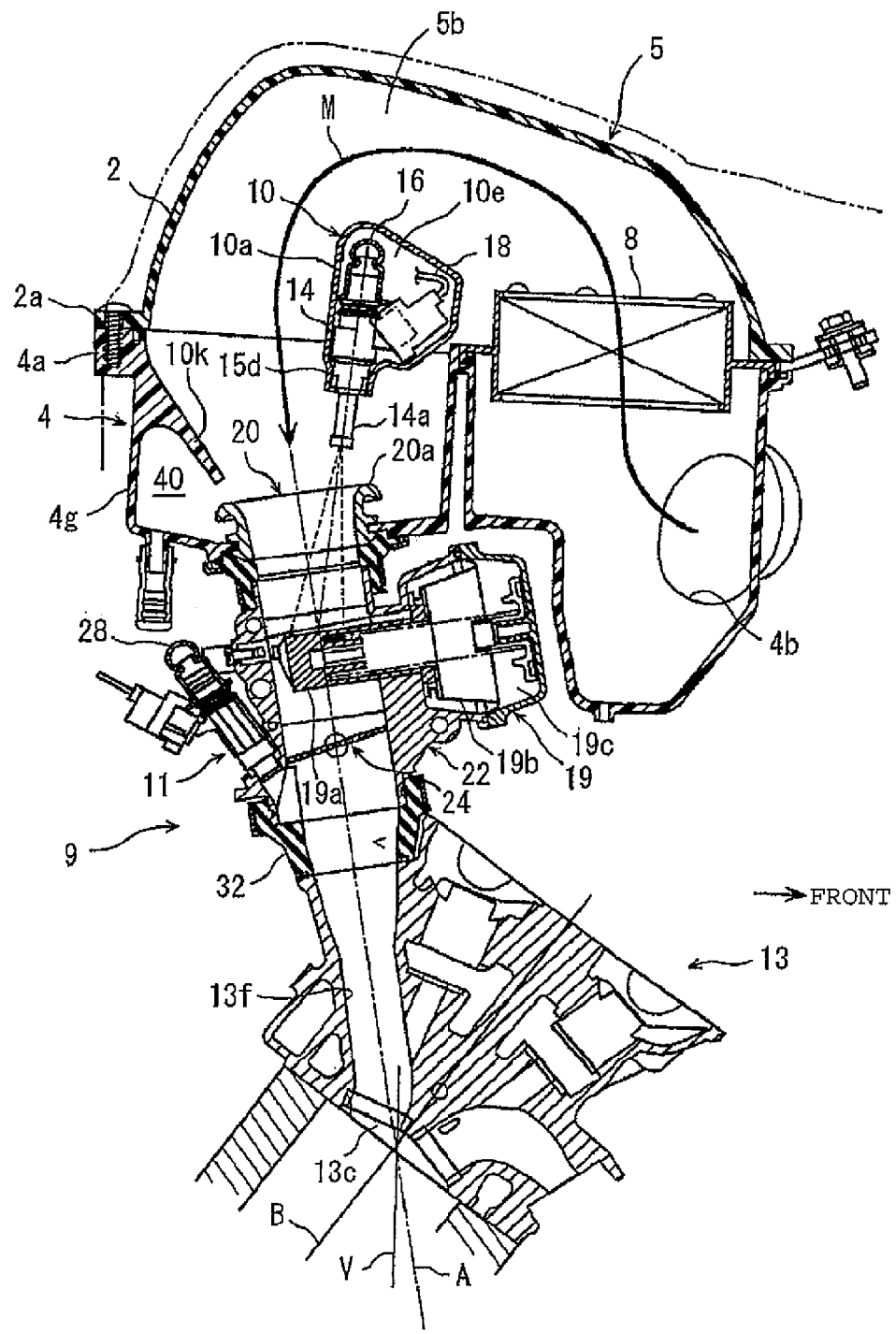

[Fig. 16]
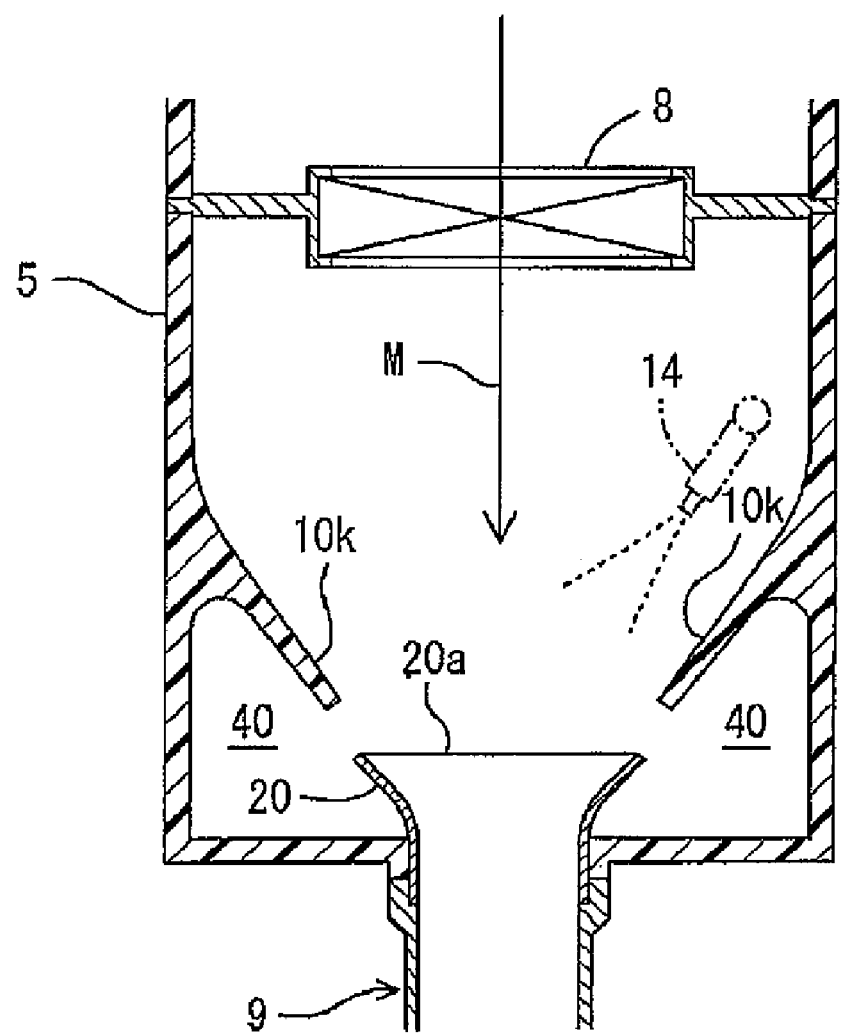

FUEL SUPPLY APPARATUS AND VEHICLE PROVIDED WITH THE SAME

TECHNICAL FIELD

The present invention relates to a fuel supply apparatus that supplies a fuel to an engine, and a vehicle provided with the same.

BACKGROUND ART

Conventionally, with general fuel supply apparatuses, a throttle valve is provided on an intake passage extending toward an engine from an air cleaner and an injector for jetting of a fuel is arranged downstream of the throttle valve in an air current direction (referred below to as "downstream injector").

On the other hand, there is a fear that a fuel feed rate becomes short only with a downstream injector at the time of high rotation/high load of an engine. Therefore, an injector is in some cases arranged in an air cleaner connected to an upstream side of an intake passage in the air current direction (referred below to as "upstream injector"). In many cases, such upstream injector is provided in a state of projecting into the air cleaner in order to ensure a volume for the air cleaner and to reduce a distance between the upstream injector and an opening of the intake passage. A fuel is jetted not only from the downstream injector but also from the upstream injector at the time of high rotation/high load of the engine.

Such construction, that is, a construction, in which an injector is arranged in a space upstream of the intake passage, is disclosed in, for example, Patent Document 1. With the construction disclosed in Patent Document 1, an injector is mounted in a chamber connected to an upstream side of an intake pipe.

More specifically, with the construction disclosed in Patent Document 1, a mount seat surface for mounting of an injector is formed on a side wall of the chamber. The mount seat surface projects into the chamber and the projecting portion thereof is formed with a hole. The injector mounted to the mount seat surface jets a fuel into the chamber through the hole.

Patent Document 1: JP-A-7-247924

DISCLOSURE OF THE INVENTION

Problems that the Invention is to Solve

By the way, in the case where a fuel is jetted into a space upstream of an intake passage as described above, it must be taken into consideration that a fuel jetted from an upstream injector flies (referred below to as "scatter") outside the intake passage due to, for example, turbulence of an air current. In particular, with a construction, in which an upstream injector projects as in Patent Document 1, the projecting portion thereof makes an air current turbulent, so that measures to suppress scattering of a fuel is essential. As such measures, it is conceivable to restrict a quantity of a fuel jetted from the upstream injector.

When a quantity of a fuel jetted from the upstream injector is restricted, however, there is a fear that a fuel is not sufficiently supplied to an engine. That is, although the upstream injector is arranged, there is a fear that it is not possible to accommodate to high rotation/high load of an engine.

The invention has been thought of in view of such point and has its object to provide a fuel supply apparatus capable of supplying a sufficient fuel even at the time of high rotation/high load of an engine to improve an engine performance, and a vehicle.

Means for Solving the Problems

A fuel supply apparatus according to the invention comprises an intake chamber including an inlet, through which an air is introduced, and an outlet, through which the introduced air is led to an engine, a rectifying member that rectifies an air current flowing from the inlet in the intake chamber to the outlet, and an injector that jets a fuel to the air current in the intake chamber.

With the fuel supply apparatus, an air current flowing from the inlet in the intake chamber to the outlet is rectified by the rectifying member. The injector jets a fuel to the rectified air current. Therefore, a fuel together with the air current flows smoothly into the outlet, so that scattering of a fuel is suppressed. Also, since scattering of a fuel is suppressed even when a distance between the injector and the outlet is large, it is possible to promote atomization of a fuel making use of a space in the intake chamber. Accordingly, it is possible to supply a sufficient fuel even at the time of high rotation/high load of an engine to improve an engine performance.

Effect of the Invention

According to the invention, since it is possible to promote atomization of a fuel jetted from an injector and to supply a sufficient fuel to an engine, it is possible to improve an engine performance even at the time of high rotation/high load of an engine.

BRIEF DESCRIPTION OF THE DRAWINGS

FIG. 1 is a side view showing a vehicle according to an embodiment of the invention.

FIG. 2 is a cross sectional view showing the construction of a fuel supply apparatus according to a first embodiment of the invention.

FIG. 3 is a cross sectional view taken along the line III-III in FIG. 2.

FIG. 4 is a cross sectional view taken along the line IV-IV in FIG. 2.

FIG. 5 is a view showing an air current around a rectifying wall.

FIG. 6 is a perspective view showing an essential part in a main chamber according to the first embodiment.

FIG. 7 is a view showing an interior of the main chamber according to the first embodiment as viewed from forwardly upwardly of a vehicle.

FIG. 8 is a view showing an interior of a main chamber according to a further embodiment as viewed from forwardly upwardly of a vehicle.

FIG. 9 is a view showing a rectifying wall according to a modification and corresponding to FIG. 2.

FIG. 10 is a view showing a rectifying wall according to a further modification and corresponding to FIG. 2.

FIG. 11 is a plan view showing a fuel supply apparatus according to a second embodiment.

FIG. 12 is a cross sectional view taken along the line XII-XII in FIG. 11.

FIG. 13 is a cross sectional view taken along the line XIII-XIII in FIG. 11.

FIG. 14 is a perspective view showing an essential part in a main chamber according to the second embodiment.

FIG. 15 is a cross sectional view showing a fuel supply apparatus according to a third embodiment.

FIG. 16 is a partial, cross sectional view showing a fuel supply apparatus according to a fourth embodiment.

DESCRIPTION OF REFERENCE NUMERALS AND SIGNS

4b: intake port (inlet)
4e: through-hole (outlet)
5: air cleaner (intake chamber)
5b: main chamber
9: intake passage
10: injector bracket (partition)
10a: rectifying wall (rectifying member)
10b: guide wall
10e: separate chamber
10g: through-hole
10j: wide portion
10k: extension wall (rectifying member)
13: engine
14: upstream injector (injector)
14e: nozzle
20: air funnel
20a: opening

BEST MODE FOR CARRYING OUT THE INVENTION

First Embodiment

An embodiment of the invention will be described below in detail with reference to the drawings.

FIG. 1 is a side view showing an example of a vehicle according to the embodiment of the invention. The vehicle according to the embodiment comprises a motorcycle (including motorbikes, scooters, etc.). In the figure, the left indicates the front of a vehicle and the right indicates the rear of a vehicle. In addition, front and rear, and left and right referred to in the specification of the present application mean front and rear, and left and right with a person, who rides a vehicle, as reference.

The motorcycle comprises an inlet port 1, through which an air is taken, an air cleaner 5, an engine 13, and a muffler 17. The inlet port 1 and the air cleaner 5 are connected to each other through an intake duct 3. The air cleaner 5 and a combustion chamber 13c (not shown in FIG. 1. see FIG. 2) of the engine 13 are connected to each other through intake passages 9. The combustion chamber 13c and the muffler 17 are connected to each other through an exhaust passage 15. Upstream injector units 7 are arranged in the air cleaner 5 and downstream injector units 11 are arranged in the intake passages 9.

In the motorcycle, an air sucked from the inlet port 1 passes through the intake duct 3 to be led to the air cleaner 5. An air purified by the air cleaner 5 and a fuel jetted from the upstream injector units 7 are sucked into the intake passages 9. In the intake passages 9, a fuel is further jetted from the downstream injector units 1. An air and a fuel in the intake passages 9 are supplied to the combustion chambers 13c in the intake stroke of the engine 13. In addition, the engine 13 in the embodiment is a water-cooling type 4-cycle parallel 4-cylinder engine. Accordingly, the intake passages 9 are provided four in number.

An air and a fuel supplied to the combustion chambers 13c are compressed in the compression stroke, burnt in the combustion stroke, and then fed to the exhaust passage 15 in the exhaust stroke. Exhaust gases fed to the exhaust passage 15 is exhausted outside through the muffler 17.

In the following descriptions, an upstream sense in an air current direction of an air passing through the air cleaner 5 and the intake passages 9 from the inlet port 1 to reach the combustion chambers 13c of the engine 13 is referred simply to as upstream and a downstream sense in the air current direction is referred simply to as downstream.

FIG. 2 is a cross sectional view showing the construction of a fuel supply apparatus. The left and the right in FIG. 2 indicate the front and the rear of a vehicle. The fuel supply apparatus comprises the air cleaner 5, the upstream injector units 7, the intake passages 9, and the downstream injector units 11.

The air cleaner 5 comprises an upper casing 2, a lower casing 4, an intake port cover 6, an element 8, and an injector bracket 10.

The upper casing 2 forms an upper, outer shell of the air cleaner 5. A recess 2a is provided on a front portion of a peripheral edge of the upper casing 2 and a recess 2d is provided on a rear portion of the peripheral edge thereof. Mounts 2b, 2c for mounting of the injector bracket 10 are formed on the back side of an upper inner surface of the upper casing 2 and in the vicinity of the recess 2d.

The lower casing 4 forms a lower, outer shell of the air cleaner 5. A projection 4a and a projection 4d, respectively, are formed on a peripheral edge of the lower casing 4. The projections 4a, 4d, respectively, are fitted into the recesses 2a, 2d of the upper casing 2. Thereby, the upper casing 2 and the lower casing 4 are fixed to each other. Fitting portions of the upper casing 2 and the lower casing 4 are sealed by a sealing member, so that airtightness in the air cleaner 5 is kept.

An intake port 4b for introduction of an air from the intake duct 3 is formed on the front of a bottom surface of the lower casing 4. Also, an inner wall 4f is provided forward in the lower casing 4 to be extended to an interior of the air cleaner 5 from the intake port 4b. An interior of the air cleaner 5 is divided into a front chamber 5a forwardly of the inner wall 4f and a main chamber 5b rearwardly of the inner wall 4f by the inner wall 4f. An air introduced from the intake port 4b is mainly led to an interior of the main chamber 5b. An air led to the main chamber 5b flows toward the intake passages 9. Consequently, an air current M is formed in the interior of the air cleaner 5 to be directed toward the intake passages 9 from the intake port 4b.

An element 8 is arranged in the main chamber 5b. An upper end 8a of the element 8 is fixed to an upper end of the inner wall 4f by a bolt 12. A lower end 8b of the element 8 is fitted into a groove 4c of the lower casing 4. Further, through-holes 4e are formed on a lower, inner surface rearwardly of the groove 4c of the lower casing 4 to permit the intake passages 9 to be inserted therethrough. As described above, since the fuel supply apparatus comprises four intake passages 9, four through-holes 4e are formed on the lower casing 4. While being not shown, the through-holes 4e are aligned in a left and right direction of a vehicle (a front-back direction of a plane in FIG. 2).

The intake port cover 6 has, for example, a lattice shape on a surface thereof and covers the intake port 4b formed on the lower casing 4. The intake port cover 6 permits an air, which flows through the intake duct 3, to be introduced into the intake port 4b and prevents large-diameter foreign matters from entering the intake port 4b.

The element 8 removes dirt and impurities of small diameter contained in an air introduced into the intake port 4b to purify an air.

The injector bracket 10 comprises rectifying walls 10a, which bulge forward (a leftward direction in FIG. 2) into the main chamber 5b, and guide walls 10b in opposition to the air current M having passed through the element 8 (see FIG. 6). The injector bracket 10 functions as a partition and forms a separate chamber 10e in the air cleaner 5 to be separate from the main chamber 5b. The upstream injector units 7 are arranged in the separate chambers 10e. The upstream injector units 7 comprise an upstream injector 14, a fuel pipe 16, and an electric power supplying harness 18. Accordingly, the upstream injectors 14 are mounted in the air cleaner 5. In the fuel supply apparatus, all portions of the upstream injectors 14 are disposed in an interior of a chamber positioned in the air cleaner 5. However, only portions of the upstream injectors 14 may be arranged in the air cleaner 5.

By the way, since the upstream injectors 14 have an irregular shape (in other words, a shape having many irregularities), the air current M is made turbulent by the upstream injectors 14 when the upstream injectors 14 are caused to project into the main chamber 5b. On the other hand, when the upstream injectors 14 are caused not to project into the air current M (in other words, centrally in the flow passage) and arranged in an upper region so as to be clear of the air current M, it is possible to first suppress turbulence of the air current M. In this case, however, members such as the fuel pipe 16, etc. project above the upper casing 2, so that it is not possible to achieve miniaturization of the apparatus. Further, when a distance between the nozzle 14a of the upstream injector 14 and an opening 20a of an air funnel 20 described later becomes excessively large, there is a fear that a fuel jetted from the nozzle 14a flies around the opening 20a even when the air current is not turbulent in the main chamber 5b.

Hereupon, according to the embodiment, the upstream injectors 14 are caused to project into the flow passage of the air current M and the rectifying walls 10a described above cover the projecting upstream injectors 14 whereby the upstream injectors 14 are prevented from becoming an obstacle to make the air current M turbulent. Also, by appropriately adjusting distances between the nozzles 14a of the upstream injectors 14 and the openings 20a of the air funnels 20, a fuel is prevented from flying around the openings 20a. In addition, the rectifying walls 10a are provided corresponding to the intake passages 9. Therefore, four rectifying walls 10a are provided according to the embodiment (see FIG. 6).

The guide walls 10b are walls formed between the rectifying walls 10a and the guide walls 10b are shaped to have a stream-line cross section. As shown in FIG. 2, the guide walls 10b comprises an upper end 10c, a curved wall extended substantially vertically downward from the upper end 10c and curved rearward, a support end 10d extended rearward from the curved wall and bent substantially upward, and an extension wall 10k curved in an opposite direction to the curved wall and extended substantially vertically downward. A lower end 10i of the extension wall 10k is positioned in the vicinity of an end of the opening 20a of the air funnel 20.

As described above, the guide walls 10b are provided in opposition to the air current M having passed through the element 8 and guide the air current M to the openings 20a. Thereby, turbulence of the air current M can be suppressed between the rectifying walls 10a and the air current M in the whole main chamber 5b can be stabilized.

In addition, the guide walls 10b may be shortened in a vertical direction so that the lower end 10i is at the same level as that of the lowermost, transverse walls of the rectifying walls 10a. That is, the extension wall 10k can be omitted. In this case, a rear wall of the lower casing 4 functions as a guide wall in a region below the lower end 10i. In this case, preferably, the air funnels 20 are arranged in positions close to the rear wall and a rear end wall of the lower casing 4 is made close to the openings 20a of the air funnels 20.

According to the embodiment, however, spaces 40 are formed between the extension walls 10k and the back wall of the lower casing 4 by providing the extension walls 10k inwardly of the rear wall of the lower casing 4. In other words, the spaces 40 are formed radially outwardly of the openings 20a of the air funnels 20.

The injector bracket 10 is fixed to the upper casing 2. More specifically, the upper end 10c of the guide walls 10b is mounted to the mount 2b of the upper casing 2 and the support ends 10d of the guide walls 10b are mounted to the mount 2c of the upper casing 2. Mount portions of the upper casing 2 and the injector bracket 10 are also sealed by a sealing member, so that airtightness in the main chamber 5b is kept.

As described above, the upstream injector units 7 comprise the upstream injector 14, the fuel pipe 16, and the electric power supplying harness 18.

The upstream injectors 14 comprise a nozzle 14a, the nozzles 14a being inserted into through-holes 10g provided on the rectifying walls 10a. Other portions than tip ends of the nozzles 14a of the upstream injectors 14 are received in the separate chambers 10e. The upstream injectors 14 are provided four in number and arranged corresponding to the four intake passages 9, respectively. The upstream injectors 14 jet a fuel into the main chamber 5b from the separate chambers 10e. More specifically, the upstream injectors 14 jet a fuel toward the air current M having been rectified by the rectifying walls 10a.

The fuel pipe 16 connects ends of the four upstream injectors 14 in the separate chambers 10e together. Also, one end of the fuel pipe 16 is connected to a fuel tank (not shown) A fuel is supplied to the respective upstream injectors 14 through the fuel pipe 16.

The electric power supplying harness 18 extends through the upper casing 2 to be led outside to be connected to a control unit (not shown). The electric power supplying harness 18 supplies electric power to the upstream injectors 14. The control unit transmits a signal to the upstream injectors 14 through the electric power supplying harness 18 to control an injection quantity and an injection timing of a fuel from the upstream injectors 14.

The intake passages 9 comprise the air funnel 20, a throttle body 22, a joint member 32, and an intake port 13f on the engine 13. In addition, according to the embodiment, the four intake passages 9 are provided, so that these respective members are arranged four in number.

The air funnel 20 is fitted into the through-hole 4e of the lower casing 4 and the opening 20a thereof projects into the main chamber 5b. The air funnel 20 permits an air and a fuel in the main chamber 5b to be led outside the air cleaner 5 through the opening 20a.

FIG. 6 is a perspective view showing an essential portion in the main chamber 5b. According to the embodiment, four air funnels 20 aligned in a left and right direction of a vehicle are opened in the main chamber 5b as shown in FIG. 6. The upstream injectors 14 and the rectifying walls 10a covering the upstream injectors 14, respectively, are arranged above the openings 20a of the respective air funnels 20.

Mounts 36 for bolts are formed on a peripheral edge of the opening 20a of the air funnel 20. Bolts extend through the mounts 36 to be fitted into an inner surface of a lower portion of the lower casing 4 whereby the air funnel 20 is fixed to the lower casing 4. Thereby, the openings 20a of the air funnels 20 are set in predetermined positions. In addition, the four air funnels 20 are fixed by means of six bolts 36. Specifically, the mounts 36 common to the openings 20a of two right air funnels 20 out of four air funnels 20 aligned in the left and right direction of the vehicle are provided between the openings 20a, and the mounts 36 common to the openings 20a of two left air funnels 20 are also provided between the openings 20a. On the other hand, mounts 36, respectively, are also provided rearwardly of the openings 20a of the respective air funnels 20. The bolts, respectively, are mounted to the six mounts 36.

The four rectifying walls 10a extended in the vehicle longitudinal direction are arranged above the openings 20a of the air funnels 20 to be spaced from one another in a left and right direction. The rectifying walls 10a bulge into the main chamber 5b and are extended to a flow passage of the air current M. Also, the rectifying walls 10a extend along the flow passage. The upstream injectors 14 are supported in the rectifying walls 10a. In other words, the upstream injectors 14 are arranged to project into the flow passage of the air current M and the rectifying walls 10a are arranged in a manner to cover the projecting upstream injectors 14.

As shown in FIG. 2, an upstream end of the throttle body 22 is connected to the air funnel 20 and a downstream end of the throttle body 22 is connected to the joint member 32. A large-diameter portion 22a is formed at an upstream end of the throttle body 22, and a downstream end of the air funnel 20 is fitted into the large-diameter portion 22a. Inner surfaces of the air funnel 20 and the throttle body 22 define a continuous surface.

A throttle valve 24 is provided substantially centrally of the throttle body 22 in a longitudinal direction. The throttle valves 24 are provided in the four throttle bodies 22, respectively, and the throttle valves 24 in adjacent throttle bodies 22 turn about the same axis. A mount 22b is formed downstream of the throttle valve 24 to fix thereto the downstream injector unit 11.

The joint member 32 connects between the throttle body 22 and the intake port 13f on the engine 13.

The intake port 13f on the engine 13 is communicated to the combustion chamber 13c. The exhaust passage 15 (see FIG. 1) is also communicated to the combustion chamber 13c. The intake port 13f is opened and closed by an intake valve 13b. An exhaust port (not shown) of the exhaust passage 15 is opened and closed by an exhaust valve 13e. In addition, the intake valve 13b and the exhaust valve 13e, respectively, are drivenly opened and closed by an exhaust cam 13a and an exhaust cam 13d.

The downstream injector units 11 comprises a downstream injector 26, a fuel pipe 28, and an electric power supplying harness 30.

The downstream injector 26 is supported on a mount 22b on the throttle body 22, and other portions than a nozzle 26a project outside the intake passage 9. The downstream injectors 26 are arranged on the respective four intake passages 9 to jet a fuel into the intake passages 9.

The fuel pipe 28 connects ends of the four downstream injectors 26 together and is connected at one end thereof to a fuel tank (not shown). The fuel pipe 28 supplies a fuel to the respective downstream injectors 26.

The electric power supplying harness 30 is connected to a control unit (not shown) to supply electric power to the downstream injectors 26. The control unit transmits a signal to the downstream injectors 26 through the electric power supplying harness 30 to control an injection quantity and an injection timing of a fuel from the downstream injectors 26.

The whole construction of the fuel supply apparatus is described above.

Subsequently, an explanation will be given to a detailed structure of the rectifying wall 10a. FIG. 3 is a cross sectional view showing the rectifying wall 10a in an air current direction (in other words, a direction along a flow passage in the air cleaner 5), that is, a cross sectional view taken along the line III-III in FIG. 2. In FIG. 3, however, a cross section of the upstream injector 14 is omitted and only a cross section of the rectifying wall 10a is shown.

As shown in FIG. 3, the rectifying wall 10a is in the form of a symmetric blade. An upstream portion 10f of the rectifying wall 10a is gradually increased in width between both left and right (vertical in FIG. 3) wall surfaces as it goes downstream from an upstream end thereof. A separate chamber 10e is formed in the upstream portion 10f to follow the shape of the left and right wall surfaces. A through-hole 10g for communication between the main chamber 5b and the separate chamber 10e is provided below the rectifying wall 10a, specifically, below a substantially central portion thereof in an air current direction (a left and right direction in FIG. 3).

A width of the rectifying wall 10a between the both wall surfaces is largest in the vicinity of the through-hole 10g. That is, a wide portion 10j of the rectifying wall 10a is defined in the vicinity of the through-hole 10g. The wide portion 10j is larger in width than the upstream injector 14 supported in the rectifying wall 10a. Accordingly, other portions than a tip end of the nozzle 14a of the upstream injector 14 are completely covered by the rectifying wall 10a. Therefore, the upstream injector 14 having an irregular shape is not exposed to an interior of the main chamber 5b.

A downstream portion 10h downstream of the through-hole 10g of the rectifying wall 10a is gradually decreased in width between both wall surfaces thereof as it goes downstream from the wide portion 10j.

FIG. 4 is a cross sectional view taken along the line IV-IV in FIG. 2. As shown in 4, the nozzle 14a of the upstream injector 14 extends through the through-hole 10g of the rectifying wall 10a. An O-ring 34 is fitted onto that portion of the through-hole 10g, through which the nozzle 14a is inserted. The nozzle 14a extends through a central hole of the O-ring 34 to be inserted into the through-hole 10g. Therefore, the through-hole 10g is sealed, so that airtightness in the main chamber 5b is kept. Accordingly, even when an air flows into the separate chamber 10e through that hole, through which, for example, the electric power supplying harness 18 is led outside the air cleaner 5, the air is prevented from flowing into the main chamber 5b. That is, an air entering from outside does not make the air current M turbulent.

The air current M is rectified as shown in FIG. 5 by the rectifying wall 10a having the configuration as described above. That is, the air current M is first smoothly separated by the upstream portion 10f. Subsequently, two air currents separated along the both wall surfaces pass laterally of the upstream injector 14 without being made turbulent by the upstream injector 14, which is received in the wide portion 10j. The two air currents having passed laterally of the upstream injector 14 combine together at that downstream end, with which the both wall surfaces of the downstream portion 10h contact, without being made turbulent, and make again one air current.

While the rectifying wall 10a comprises the upstream portion 10f and the downstream portion 10h, the upstream portion 10f and the downstream portion 10h, respectively, function differently.

That is, the upstream portion 10f prevents an air current M from striking directly against the upstream injector 14 having an irregular shape. Also, the upstream portion 10f separates the air current M smoothly along the both wall surfaces of the rectifying wall 10a. Thereby, the upstream portion 10f suppresses turbulence of the air current M between the upstream end of the rectifying wall 10a and the wide portion 10j.

On the other hand, especially in the case where the air current M is increased in flow rate at the time of high rotation/high load of the engine 13, the downstream portions 10h prevents generation of Karman's vortex on the downstream side of the upstream injector 14 to suppress turbulence of the air current M between the wide portion 10j and the downstream end of the rectifying wall 10a.

In this manner, the upstream portion 10f and the downstream portion 10h, respectively, suppress turbulence of the air current M even singly. Therefore, only one of them may be provided on the rectifying wall 10a. For example, as shown in FIG. 9, the rectifying wall 10a may comprise a wide portion 10j being larger in width than the upstream injector 14 and an upstream portion 10f extending upstream of the wide portion 10j. In this case, it suffices that the upstream injector 14 be arranged inside the wide portion 10j, or downstream of the wide portion 10j. Thereby, since the air current M does not strike directly against the upstream injector 14, it is possible to prevent turbulence of the air current M. In the case where the air current M is relatively slow in flow rate, there is less fear that Karman's vortex or the like is generated on the downstream side of the upstream injector 14. Also, even when Karman's vortex is generated, turbulence of the air current M is relatively small since the vortex is small in intensity. Therefore, only the upstream portion 10f and the wide portion 10j can suppress turbulence of the air current M effectively.

On the other hand, as shown in, for example, FIG. 10, the rectifying wall 10a may comprise a wide portion 10j being substantially equal in width to the upstream injector 14 and a downstream portion 10h extended downstream of the wide portion 10j. In this case, it suffices that the upstream injector 14 be arranged inside the wide portion 10j, or upstream of the wide portion 10j. Thereby, even when the air current M becomes large in flow rate, the air current downstream of the upstream injector 14 is rectified, so that it is possible to prevent generation of Karman's vortex. In addition, when the upstream injector 14 is small in width, turbulence of the air current M upstream of the upstream injector 14 can be neglected practically. Therefore, only the wide portion 10j and the downstream portion 10h can suppress turbulence of the air current M effectively.

In addition, the upstream portion 10f and the downstream portion 10h are in no way limited in shape. For example, the upstream portion 10f may be semi-circular in shape and only the downstream portion 10h may have a symmetric blade configuration as shown in FIG. 3. It suffices that the rectifying wall 10a have a configuration, of which a portion of a cross section in the air current direction is suited to rectification, for example, a symmetric blade configuration.

FIG. 7 is a view showing an essential part in the main chamber 5b as viewed from forwardly upwardly of a vehicle.

According to the embodiment, centers (see dashed lines in FIG. 7) of rectifying walls 10a are positioned inside opened portions of openings 20a in a left and right direction (a left and right direction in FIG. 7) of a vehicle. Also, a through-hole 10g is provided centrally of the rectifying wall 10a in the left and right direction. Therefore, a fuel jetted from the nozzles 14a of the upstream injectors 14 is jetted toward centers of the openings 20a and carried over to the air current M having been rectified by the rectifying walls 10a. Accordingly, a fuel jetted from the nozzles 14a is liable to flow into the openings 20a without scattering. Also, at this time, atomization of the jetted fuel is promoted since somewhat large spaces are ensured between the nozzles 14a and the openings 20a. That is, a fuel having been adequately atomized flows into the openings 20a.

Subsequently, an explanation will be given to an operation of the fuel supply apparatus.

An air introduced from the inlet port 1 passes through the intake duct 3 to be guided into the intake port 4b of the air cleaner 5. At this time, the intake port cover 6 prevents foreign matters having a large particle size from flowing into the intake port 4b. Therefore, it is possible to prevent damage to the inner wall 4f exposed to the intake port 4b and the element 8.

An air introduced into the intake port 4b is further purified by the element 8. More specifically, small dirt and impurities contained in the air introduced into the intake port 4b are removed by the element 8. The purified air flows into the interior of the main chamber 5b of the air cleaner 5. The in flowing air flows in the main chamber 5b to form an air current M directed toward the openings 20a of the air funnels 20.

Specifically, when an air having passed through the element 8 is led by the guide walls 10b of the injector bracket 10, so that a direction, in which the air flows, is smoothly varied. Thus an air current M directed toward the openings 20a opened in the vicinity of the lower end 10i is formed. While the rectifying walls 10a receiving therein the upstream injectors 14 project into the air current M, the air current M is rectified by the rectifying walls 10a since the rectifying walls 10a have a symmetric blade configuration described above. Therefore, turbulence of the air current M is suppressed.

Also, according to the embodiment, the air inlet port 1 is provided on the front of a vehicle as shown in FIG. 1 and the air cleaner 5 is provided on the vehicle rearwardly of the inlet port 1. Accordingly, when the vehicle travels, travel wind flowing rearward from the front energizes the air current in the intake duct 3 and much air is introduced from the intake port 4b of the air cleaner 5.

Further, the openings 20a of the air funnels 20 being air outlets are provided rearwardly of the intake port 4b in the air cleaner 5. That is, the air flow passage is structured to be directed wholly rearward from the front. Therefore, travel wind energizes the air current M in the main chamber 5b of the air cleaner 5 when the vehicle travels, and the air current M is increased in flow rate. When the air current M is increased in flow rate, an air quantity supplied to the engine 13 per unit time is consequently increased, so that it is possible to achieve a further improvement in engine performance.

When the air current M is increased in flow rate, however, there is a high possibility that turbulence of the air current M in the main chamber 5b is increased. According to the embodiment, however, the air current M is rectified by the rectifying walls 10a and guided to the openings 20a of the air funnels 20 by the guide walls 10b. Therefore, even when the air current M is increased in flow rate, it is possible to form a stable air current M in the main chamber 5b. Also, since the guide walls 10b and the extension walls 10k extend in the left and right direction, it is possible to evenly bear the air current (in other words, the air current increased in dynamic pressure) M, which increased in flow rate, to guide the air current M to the openings 20a effectively.

In the intake stroke of the engine 13, electric power is supplied to the electric power supplying harnesses 18, 30 through control by a control unit (not shown), and a fuel is jetted from the upstream injectors 14 and the downstream injectors 26.

A fuel jetted from the upstream injectors 14 is atomized making use of the space in the main chamber 5b and then led to the openings 20a by the rectified air current M. Since the air current M in the main chamber 5b in the fuel supply apparatus is not made considerably turbulent, it is not necessary to take into consideration that a fuel jetted from the upstream injectors 14 is scattered around the openings 20a. Therefore, a sufficient quantity of fuel corresponding to high rotation/high load of the engine 13 can be jetted from the upstream injectors 14.

An air and a fuel having flowed into the openings 20a flow into the throttle bodies 22 from the air funnels 20. An air and a fuel of quantities conformed to opening degrees of the throttle valves 24 flow further into the joint members 32 and the intake ports 13f on downstream sides. A fuel is jetted on the downstream sides of the throttle valves 24 from the downstream injectors 26. When the intake valves 13b are opened by the exhaust cams 13a, a mixture of an air and a fuel is supplied to the combustion chambers 13c. The mixture is compressed in the combustion chambers 13c in the compression stroke and the compressed mixture explodes in the combustion stroke to give a motive power.

In the exhaust stroke subsequent to the combustion stroke, the exhaust valves 13e are opened by the exhaust cams 13d. Thereby, exhaust gases generated in explosion are discharged into the exhaust passage 15 to be exhausted outside from the muffler 17. At the termination of the exhaust stroke, the intake stroke is succeedingly begun and the operations described above are repeated.

As described above, according to the embodiment, while the upstream injectors 14 project into the flow passage, they are covered by the rectifying walls 10a. Accordingly, it is possible to prevent the air current from being diffused by the upstream injectors 14 having an irregular shape and Karman's vortex, etc. from being generated on downstream sides of the upstream injectors 14. Therefore, it is possible to suppress turbulence of the air current M in the air cleaner 5. Accordingly, there is less fear that a fuel is scattered outside the intake passages 9, and it is possible to supply a sufficient quantity of fuel from the upstream injectors 14.

The fuel supply apparatus comprises, as a member that rectifies the air current, rectifying walls 10a extending along the flow passage. Therefore, it is possible to rectify the air current with a ready construction.

Further, the rectifying walls 10a receiving therein the upstream injectors 14 are extended to a center of the flow passage. Therefore, it is possible to easily jet a fuel toward the air current M having been rectified by the rectifying walls 10a. Here, the air current M is formed in a large space in the main chamber 5b. Therefore, atomization of a fuel can be promoted making use of the large space in the main chamber 5b by jetting a fuel toward the air current M.

Also, the rectifying walls 10a comprise the wide portion 10j being larger in width in a left and right direction than other portions. Therefore, by arranging the wide portion 10j upstream or downstream of an obstacle (the upstream injector 14 in the embodiment), which makes the air current M turbulent, it is possible to suppress turbulence of the air current M caused by the obstacle.

Since a cross section of the rectifying wall 10a in a direction along the flow passage is in the form of a symmetric blade, the air current M is guided along the wall surfaces whereby it can be rectified effectively. Also, it is possible to achieve effectively making use of a space through arrangement of the upstream injector 14 in that portion, in which a symmetric blade is wide.

With the fuel supply apparatus, centers of the rectifying walls 10a are positioned inside opened portions of the openings 20a in the left and right direction, the air current M flowing into one opening 20a can be effectively rectified by a single rectifying wall 10a. Also, since the upstream injectors 14 are received in the rectifying walls 10a, it is possible to jet a fuel from positions close to the openings 20a to further suppress scattering. In addition, since centers of the rectifying walls 10a are positioned inside the intake port 4b in the left and right direction, the air current M having flowed from the intake port 4b can be effectively rectified by the rectifying walls 10a.

With the fuel supply apparatus, since the openings 20a of the plurality of air funnels 20 are aligned in the left and right direction and the rectifying walls 10a are extended in the longitudinal direction, an air led out from the respective openings 20a can be made uniform in quantity and a fuel supplied to the engine from the respective openings 20a can be made uniform in quantity.

Also, since the openings 20a of the plurality of air funnels 20 are aligned in the left and right direction and the guide walls 10b and the extension walls 10k extend in the left and right direction, it is possible to distribute the air current M to the respective openings 20a in a well-balanced manner. Accordingly, a fuel supplied to the engine from the respective openings 20a can be made uniform in quantity.

Since the rectifying walls 10a are provided to correspond to each of the plurality of openings 20a to be spaced from one another, turbulence of the air current can be further surely suppressed by arranging the guide walls 10b between the rectifying walls 10a.

Since the rectifying walls 10a are extended in a direction (a longitudinal direction) intersecting a longitudinal direction (a left and right direction of a vehicle) of the element 8, it is possible to easily form a plurality of rectifying walls 10a in a limited space in the main chamber 5b. Therefore, it is possible to easily form rectifying walls 10a corresponding in number to the respective openings 20a.

Also, with the fuel supply apparatus, the extension walls 10k are provided to lead the air current M to the openings 20a of the air funnels 20, so that the extension walls 10k can also suppress turbulence of the air current M. Further, since the spaces 40 are formed on back sides of the extension walls 10k, it is possible to ensure a sufficient volume for the air cleaner 5 unlike the case where a rear wall of the lower casing 4 is caused to project forward. That is, although rectifying members (the extension walls 10k) are newly provided to lead the air current M to the openings 20a, it is possible to restrict a decrease in the volume of the air cleaner 5. Accordingly, there is no fear that degradation in engine performance is incurred due to insufficiency in the volume of the air cleaner 5. Consequently, it is possible to improve an engine performance while preventing scattering of a fuel.

By the way, according to the embodiment, the through-holes 10g are formed on transverse walls at the downstream ends of the rectifying walls 10a. Therefore, a fuel jetted from the upstream injectors 14 is jetted toward the air current M having been rectified. However, the through-holes 10g are not limited in positions especially but the through-holes 10g may be formed on vertical walls at upstream ends of the rectifying walls 10a. A fuel may be jetted toward the air current M before being rectified, from the upstream injectors 14.

In addition, according to a further embodiment of the invention, as shown in, for example, FIG. 8, plate-shaped rectifying walls 10a' extended forward may be formed outside openings 20a, that is, between adjacent openings 20a so that two adjacent rectifying walls 10a' define definite flow passages of an air current M corresponding to the respective openings 20a.

In this case, since upstream injectors 14 project into flow passages of the air current M, turbulence is generated in the air current M but an air and a fuel do not flow outside the openings 20a and a fuel is not scattered around the openings 20a since definite flow passages to the respective openings 20a are formed by the rectifying walls 10a'.

Also, rectifying walls 10a or 10a' may be provided in the vicinity of an element 8, which defines an air inlet port to a main chamber 5b, to rectify an air current having just passed through the element 8. Further, according to the invention, the upstream injectors 14 and the rectifying walls 10a or 10a' may not necessarily be made close to each other. That is, for example, the upstream injectors 14 may be arranged in the vicinity of the element 8 and a fuel may be jetted to that air current M, which has passed through the element 8 but has not been rectified. In this case, the rectifying walls 10a or 10a' provided above the openings 20a of the air funnels 20 may rectify the air current M containing a fuel to lead the same outside from the openings 20a.

Second Embodiment

A fuel supply apparatus according to a second embodiment will be described with reference to FIGS. 11 to 14. In addition, the same portions as those in the first embodiment are denoted by the same reference numerals as those in the latter, and a detailed explanation therefor is omitted.

According to the first embodiment, the lower ends 10i of the extension walls 10k are extended to substantially the same level of ends of the openings 20a of the air funnels 20 (see FIG. 2). In contrast, as shown in FIGS. 12 and 13, according to the second embodiment, lower ends 10i of extension walls 10k are positioned above openings 20a of air funnels 20. That is, clearances are formed between the extension walls 10k and the openings 20a in a direction, in which the openings 20a are opened (a vertical direction in FIG. 12).

As shown in FIG. 12, according to the embodiment, an injector bracket 10 is arranged in a main chamber 5b of an air cleaner 5 and separate chambers 10e are formed in the injector bracket 10. Upstream injector units 7 are accommodated in the separate chambers 10e.

Also, the air cleaner 5 comprises an upper casing 2 and a lower casing 4. A flange 51 of the upper casing 2 and a flange 52 of the lower casing 4 are fixed together by bolts 53 and nuts 54. An end of the injector bracket 10 and the upper casing 2 are fixed together by bolts 55, which are inserted from outside the upper casing 2. In addition, fasteners such as the bolts 55 are exemplary and other fasteners such as screws can be of course used.

According to the embodiment, the injector bracket 10 comprises rectifying walls 10a and guide walls 10b, the respective rectifying walls 10a covering the respective upstream injectors 14. As shown in FIG. 14, the rectifying walls 10a according to the embodiment are formed to be substantially in the form of a circular column. That is, the rectifying walls 10a are arcuate-shaped in cross section. However, the rectifying walls 10a are not specifically limited in shape.

As shown in FIG. 12, the extension walls 10k project downward. That is, the extension walls 10k project toward the openings 20a of the air funnels 20. The lower ends 10i of the extension walls 10k are positioned radially outwardly of the openings 20a. However, the lower ends 10i may be positioned radially inwardly of the openings 20a. Surfaces of the extension walls 10k face centrally of the main chamber 5b and back surfaces of the extension walls 10k face a back wall 4g of the lower casing 4. The extension walls 10k are away from the back wall 4g of the lower casing 4 and spaces 40 are formed between the back surfaces of the extension walls 10k and the back wall 4g. The surfaces of the extension walls 10k define rectifying wall surfaces (first wall surfaces) that lead an air current to the openings 20a. On the other hand, the back surfaces of the extension walls 10k define compartment surfaces (second wall surfaces) that compartment the spaces 40.

As shown in FIG. 14, the extension walls 10k are provided at lower ends of the guide walls 10b to form parts of the guide walls 10b. Also, the extension walls 10b are also provided below the rectifying walls 10a. Therefore, the air current led to the rectifying walls 10a is guided to the openings 20a by the extension walls 10k. Also, the extension walls 10k extend downwardly of nozzles of the upstream injectors 14. Therefore, it is possible to effectively suppress scattering of a fuel.

As shown in FIG. 12, a fuel pipe 16 is connected to upper ends of the respective upstream injectors 14. As shown in FIG. 11, insertion holes 43, 44 are formed on a back wall of the upper casing 2. Inserted through the insertion hole 43 is an electric power supplying harness 18 bundled integrally. In addition, a connection connector 45 is connected to an end of the electric power supplying harness 18. The fuel pipe 16 is inserted through the insertion hole 44.

As shown in FIG. 12, an opening 41 projecting rearward is provided on the back wall 4g of the lower casing 4. A pipe 42 is fitted into the opening 41, the pipe 42 being fixed to the opening 41 by a clip 46. The pipe 42 leads blow-by gases of the engine 13 to the air cleaner 5. The other end of the pipe 42 is connected to a crankcase (not shown) of the engine 13.

A base end side of the opening 41 is opened between the extension walls 10k and the back wall 4g, that is, into the spaces 40. Therefore, blow-by gases are once supplied to the spaces 40 and then combine with the air current in the air cleaner 5 to flow into the air funnels 20.

According to the embodiment, it is also possible in the embodiment to suppress turbulence of the air current in the air cleaner 5 in the same manner as in the first embodiment. Therefore, it is possible to prevent a fuel jetted from the upstream injectors 14 from scattering. Accordingly, it is possible to jet a sufficient quantity of fuel from the upstream injectors 14. Also, distances between the upstream injectors 14 and the openings 20a of the air funnels 20 can be relatively lengthened to promote atomization of a fuel.

Further, although the extension walls 10k are provided for the purpose of rectification, it is possible to restrict a decrease in a volume of the air cleaner 5 because the spaces 40 are formed on the back sides of the extension walls 10k. In this manner, since it is possible to produce effects of an increase in fuel feed rate and promotion of atomization described above while restricting a decrease in a volume of the air cleaner 5, it is possible to adequately improve an engine performance.

Besides, with the fuel supply apparatus, blow-by gases are supplied to the spaces 40, so that there is less fear that turbulence of the air current is caused by blow-by gases. That is, the spaces 40 on the back sides of the extension walls 10k make it possible not only to increase a volume of the air cleaner 5 but also to suppress turbulence of the air current caused by blow-by gases. Also, blow-by gases once flow into the spaces 40 and then flow into the openings 20a of the air funnels 20. Therefore, since blow-by gases do not flow directly into the openings 20a, they are liable to uniformly flow into the respective openings 20a. In other words, blow-by gases are rectified by the back sides of the extension walls 10k to uniformly flow into the respective openings 20a. Accordingly, it is possible to prevent a difference every cylinder in air/fuel ratio.

In addition, according to the embodiment, the openings 20a of the air funnels 20 also project into the main chamber 5b from an inner surface of the lower casing 4. Therefore, it is unnecessary to make peripheral edges of the openings 20a follow the inner surface of the lower casing 4. Therefore, it is easy to perform exchange of the air funnels 20 and it is possible to readily set the air funnels 20.

Also, with the fuel supply apparatus, the lower ends 10i of the extension walls 10k and the openings 20a of the air funnels 20 are vertically separate from each other. Therefore, it is possible to make the openings 20a surely function as open ends of the air funnels 20.

Also, with the fuel supply apparatus, the surfaces of the extension walls 10k rectify the air current and the back surfaces of the extension walls 10k compartment the spaces 40, so that rectification of the air current and compartmentation of the spaces 40 can be realized by a single member (the extension walls 10k).

With the fuel supply apparatus, a flow passage in the air cleaner 5 is curved in a substantially inverted U-shaped manner. Therefore, while the air current is varied in a direction of ventilation, it flows toward the openings 20a of the air funnels 20 from the intake port 4b. On the other hand, the extension walls 10k are arranged on an opposite side to the intake port 4b with the openings 20a of the air funnels 20 as a reference. Accordingly, the extension walls 10k are provided in positions opposed to the air current, so that they can rectify the air current efficiently.

Third Embodiment

According to the first and second embodiments, the extension walls 10k are provided on the injector bracket 10. That is, a part of the injector bracket 10 constitutes the extension walls 10k. However, extension walls 10k may be separate from an injector bracket 10. As shown in FIG. 15, according to a third embodiment, the extension walls 10k are formed separately from the injector bracket 10.

In FIG. 15, the right indicates the front of a vehicle and the left indicates the rear of a vehicle. According to the embodiment, an air cleaner 5 comprises an upper casing 2 and a lower casing 4, and an intake port 4b is formed on the front of the lower casing 4. Formed in the air cleaner 5 is a flow passage curved in a substantially inverted U-shaped manner.

According to the third embodiment, the injector bracket 10 is arranged inside the curved flow passage (toward a center of curvature). The injector bracket 10 is formed to assume a shape of a cylinder extending in a left and right direction (a front-back direction of a plane in FIG. 15) and extends through left and right side walls of the upper casing 2. While illustration is omitted, the extending-through portion is supported by flanges of the lower casing 4 and the upper casing 2.

An interior of the injector bracket 10 is compartmented into separate chambers 10e and upstream injectors 14, etc. are accommodated in the separate chambers 10e. The upstream injectors 14 are inserted into a boss 15d of the injector bracket 10 and nozzles 14a project downwardly of the boss 15d.

An extension wall 10k is arranged on an opposite side to the injector bracket 10 with the openings 20a of the air funnels 20 as a reference. That is, the extension wall 10k is arranged on an opposite side (outside) to the center of curvature of the flow passage. Accordingly, the extension wall 10k is positioned on a side opposed to the air current M.

The extension wall 10k is formed to assume a plate shape projecting obliquely downward from a back wall 4g of the lower casing 4. A surface of the extension wall 10k faces centrally of a main chamber 5b and a back surface of the extension wall 10k faces the back wall 4g. The back surface of the extension wall 10k is separate from an inner surface of the back wall 4g. Consequently, a space 40 is formed among the back surface of the extension wall 10k, the inner surface of the back wall 4g, and outsides of the openings 20a of the air funnels 20.

The extension wall 10k may have a stream-line cross section, or a further curved-surface cross section. Also, the extension wall 10k may have a straight cross section. The extension wall 10k suffices to lead the air current to the openings 20a and is not specifically limited in shape.

A throttle body 22 according to the embodiment comprises a diaphragm type cushion valve 19 on an upstream side of a throttle valve 24. With the cushion valve 19, a piston valve 19a for increase and decrease in intake passage area is biased toward a closed side. Also, the piston valve 19a is connected to a diaphragm 19b and structured to introduce negative pressure in an intake passage 9 into a diaphragm chamber 19c. Owing to the provision of such cushion valve 19, in the case where the throttle valve 24 is abruptly opened, the piston valve 19a opens the intake passage 9 a little late to conform an increase in air quantity to an increase in fuel injection quantity whereby it is possible to achieve a smooth rise in rotation of the engine.

In addition, a character V in FIG. 15 denotes a line indicative of a vertical direction, a character A denotes a central line of the intake passage 9, and a character B denotes a bore axis of the engine 13.

According to the embodiment, it is also possible to produce the same effect as those in the respective embodiments described above. That is, it is possible to rectify the air current M while restricting a decrease in a volume of the air cleaner 5. Therefore, it is possible to produce effects of an increase in fuel feed rate for the upstream injectors 14 and promotion of atomization and it is possible to improve an engine performance.

Also, according to the embodiment, the extension wall 10k is formed plate-shaped, so that it is possible to thin the extension wall 10k. Therefore, the space 40 on the back side of the extension wall 10k can be made relatively large. Accordingly, it is possible to ensure a sufficient volume for the air cleaner 5 and to improve an engine performance.

Fourth Embodiment

According to the respective embodiments described above, the flow passage in the air cleaner 5 is curved and the extension walls 10k are arranged on an opposite side to the center of curvature of the flow passage. However, the shape of the flow passage and arrangement and positions of the extension walls 10k are not limited to those in the respective embodiments. According to a fourth embodiment, a shape of a flow passage and arrangement and position of an extension wall 10k are modified.

As shown in FIG. 16, according to the fourth embodiment, a substantially straight flow passage is formed in an air cleaner 5. However, the whole flow passage is required not to be straight but only a part of the flow passage may be straight. An upstream injector 14 jets a fuel between an element 8 and an opening 20a of an air funnel 20. In addition, the upstream injector 14 is preferably positioned in the vicinity of a wall surface of the air cleaner 5 but is not specifically limitative.

The extension wall 10k comprises a rectifying plate projecting toward the opening 20a from the wall surface of the air cleaner 5 and inclined relative to a direction along the flow passage. A tip end of the extension wall 10k is positioned outside an opening center of the opening 20a. However, the tip end of the extension wall 10k may be positioned inside the opening 20a. The extension walls 10k are in no way limited in number. Two extension walls 10k may be provided on both sides of the opening 20a. Also, a plurality of extension walls 10k may be arranged to be circumferentially distributed around the opening 20a, or a single extension wall 10k may be circumferentially formed so as to surround a periphery of the opening 20a.

According to the embodiment, a space 40 is also formed among a back surface of the extension wall 10k, an inner surface of the air cleaner 5, and an outer peripheral surface of the opening 20a of the air funnel 20.

An air having flowed into the air cleaner 5 passes through the element 8 and then flows into the openings 20a of the air funnels 20. At this time, the air current M is led to the openings 20a by the extension walls 10k. That is, the air current M as rectified is formed in the air cleaner 5 to be directed to the openings 20a from the element 8.

Accordingly, according to the embodiment, it is also possible to produce the same effect as those in the respective embodiments.

INDUSTRIAL APPLICABILITY

As described above, the invention is useful for fuel supply apparatuses and vehicles.

The invention claimed is:

1. A fuel supply apparatus comprising:
    an air cleaner chamber including an inlet, through which an air is introduced in a first direction, and an outlet, through which the introduced air is led to an engine in a second direction which is different from the first direction,
    a rectifying member that rectifies an air current flowing from the inlet in the air cleaner chamber to the outlet,
    an injector that is mounted on a casing forming the air cleaner chamber and jets a fuel to the air current flowing from the inlet in the air cleaner chamber to the outlet;
    a filter element that is disposed between the inlet and the outlet in the air cleaner chamber, the air passing through the filter element, and
    an intake passage projecting into the air cleaner chamber from the outlet and having an opening opened to the air cleaner chamber, the intake passage comprising a throttle valve therein, wherein the air and the fuel in the air cleaner chamber are led to the engine through the intake passage.

2. The fuel supply apparatus according to claim 1, wherein a flow passage leading to the outlet from the inlet is formed in the air cleaner chamber, and
    the rectifying member comprises a rectifying wall extending along the flow passage.

3. The fuel supply apparatus according to claim 2, wherein the rectifying wall includes a wide portion, of which a width in a first direction perpendicular to a second direction, in which the rectifying wall extends, is larger than that of the remaining portion.

4. The fuel supply apparatus according to claim 3, wherein the injector includes an in-chamber portion arranged in the air cleaner chamber,
    the rectifying wall is arranged upstream of the in-chamber portion, and
    the wide portion of the rectifying wall is positioned at a downstream end of the rectifying wall and has a larger width than that of the in-chamber portion.

5. The fuel supply apparatus according to claim 3, wherein the injector includes an in-chamber portion arranged in the air cleaner chamber,
    the rectifying wall is arranged downstream of the in-chamber portion, and
    the wide portion of the rectifying wall is positioned at an upstream end of the rectifying wall and has substantially the same width as that of the in-chamber portion.

6. The fuel supply apparatus according to claim 3, wherein the injector includes an in-chamber portion arranged in the air cleaner chamber, and
    the rectifying wall covers the in-chamber portion, supports the in-chamber portion, and extends downstream of the in-chamber portion from upstream thereof.

7. The fuel supply apparatus according to claim 2, wherein at least a part of the rectifying wall is in the form of a symmetric blade.

8. The fuel supply apparatus according to claim 2, wherein a center of the rectifying wall in a first direction perpendicular to a second direction, in which the rectifying wall extends, is positioned inside the inlet or the outlet.

9. The fuel supply apparatus according to claim 2, wherein the air cleaner chamber includes a plurality of outlets, and
    the rectifying walls are provided in plural corresponding to each of the plurality of outlets, and
    the plurality of rectifying walls are arranged to be spaced from one another.

10. The fuel supply apparatus according to claim 2, wherein a center of the rectifying wall in a first direction perpendicular to a second direction, in which the rectifying wall extends, is positioned outside the outlet.

11. The fuel supply apparatus according to claim 10, wherein the air cleaner chamber includes a plurality of outlets, and
    a center of the rectifying wall in a first direction perpendicular to a second direction, in which the rectifying wall extends, is positioned between the plurality of outlets.

12. The fuel supply apparatus according to claim 1, further comprising a partition provided in the air cleaner chamber to compartment a main chamber, in which a flow passage extending from the inlet to the outlet is formed, and a separate chamber partitioned from the main chamber, the partition being formed with a through-hole, which connects the separate chamber and the main chamber,
    wherein the injector is supported in the separate chamber by the partition to jet a fuel into the main chamber from the through-hole, and
    the rectifying member is formed by the partition.

13. The fuel supply apparatus according to claim 12, wherein the injector comprises a nozzle inserted into the through-hole, and
    further comprising a sealing member to seal a clearance between the through-hole and the nozzle.

14. The fuel supply apparatus according to claim 1, wherein the filter element purifies the air, and
    the rectifying member comprises a rectifying wall extending in a direction intersecting a longitudinal direction of the filter element.

15. The fuel supply apparatus according to claim 1, wherein the rectifying member comprises a wall surface, by which the air current from the inlet is led to the opening, and
    a space is formed radially outwardly of the opening in the intake chamber.

16. The fuel supply apparatus according to claim 15, further comprising a blow-by gas passage that provides communication between an interior of a crankcase of the engine and the space.

17. The fuel supply apparatus according to claim 15, wherein the rectifying member comprises a compartment surface that compartments the space.

18. The fuel supply apparatus according to claim 17, wherein the rectifying member is composed of a rectifying plate projecting toward the opening.

19. The fuel supply apparatus according to claim 15, wherein a clearance is formed between the rectifying member and the opening in a direction, in which the opening is opened.

20. The fuel supply apparatus according to claim 15, wherein the injector comprises a nozzle, and
at least a part of the wall surface is positioned downstream of the nozzle and upstream of the opening.

21. The fuel supply apparatus according to claim 15, wherein the wall surface is positioned on an opposite side to the inlet with the opening as reference.

22. The fuel supply apparatus according to claim 1, wherein the rectifying member comprises a first wall surface extending toward the opening, and a second wall surface positioned radially outwardly of the opening relative to the first wall surface and separated from an inner surface of the air cleaner chamber.

23. A vehicle comprising the fuel supply apparatus according to claim 1.

24. The vehicle according to claim 23, wherein
the outlet is positioned rearwardly of the inlet, and
the rectifying member comprises a rectifying wall extending substantially in a longitudinal direction.

25. The vehicle according to claim 23, wherein
the air cleaner chamber comprises a plurality of outlets aligned in a left and right direction, and
the rectifying member comprises a rectifying wall extending substantially in a longitudinal direction.

26. The vehicle according to claim 23, wherein
the outlet is positioned rearwardly of the inlet, and
the rectifying member comprises a rectifying wall extending substantially in a left and right direction.

27. The vehicle according to claim 23, wherein
the air cleaner chamber comprises a plurality of outlets aligned in a left and right direction, and
the rectifying member comprises a rectifying wall extending substantially in a left and right direction.

28. A fuel supply apparatus comprising:
an air cleaner chamber including an inlet, through which an air is introduced, and a plurality of outlets, through which the introduced air is led to an engine,
a rectifying member that rectifies an air current flowing from the inlet in the air cleaner chamber to the respective outlets,
a plurality of injectors that are mounted on a casing forming the cleaner chamber and jets a fuel to the air current in the air cleaner chamber, and
a plurality of intake passages projecting into the air cleaner chamber from the outlets respectively, and each having an opening opened to the air cleaner chamber, wherein
the rectifying member comprises a plurality of guide walls opposite to the air current passing from the inlet so as to lead the air current to the openings of the intake passages respectively, and a plurality of rectifying walls adjacent to the guide walls respectively, bulging into the air cleaner chamber more than the guide walls, and covering the injectors respectively.

29. The fuel supply apparatus according to claim 1, wherein the rectifying member covers the injector so as to prevent the injector from making the air current turbulent.

30. The fuel supply apparatus according to claim 1, wherein an injector unit, which includes the injector, a fuel pipe and an electric power supply harness, is mounted on the casing forming the air cleaner chamber, and the rectifying member covers the injector unit so as to prevent the injector unit from making the air current turbulent.

* * * * *